(No Model.) 8 Sheets—Sheet 1.
J. F. LAIDLAW.
STEAM BOILER.

No. 541,239. Patented June 18, 1895.

Fig. 1.

Witnesses:
F. Gustav Wilhelm
Theo. L. Popp

John F. Laidlaw Inventor.
By Wilhelm & Bonner
Attorneys.

(No Model.)  J. F. LAIDLAW.  8 Sheets—Sheet 2.
STEAM BOILER.

No. 541,239.  Patented June 18, 1895.

Fig. 2.

Witnesses:
F. Gunter Wilhelm.
Theo. L. Opp.

John F. Laidlaw, Inventor.
By Wilhelm & Bonner
Attorneys (No Model.) 8 Sheets—Sheet 3.

J. F. LAIDLAW.
STEAM BOILER.

No. 541,239. Patented June 18, 1895.

Witnesses:
F. Gustav Wilhelm
Theo. L. Popp

John F. Laidlaw Inventor
By Wilhelm & Bonner
Attorneys.

(No Model.)  8 Sheets—Sheet 6.
J. F. LAIDLAW.
STEAM BOILER.

No. 541,239. Patented June 18, 1895.

Fig. 8.

Witnesses:
F. Gustav Wilhelm.
Theo. L. Popp.

John F. Laidlaw Inventor.
By Wilhelm & Bonner
Attorneys.

THE NORRIS PETERS CO., PHOTO-LITHO., WASHINGTON, D. C.

(No Model.) 8 Sheets—Sheet 8.
J. F. LAIDLAW.
STEAM BOILER.

No. 541,239. Patented June 18, 1895.

UNITED STATES PATENT OFFICE.

JOHN F. LAIDLAW, OF ELMIRA, ASSIGNOR OF ONE-HALF TO ESTHER A. LAIDLAW, OF BATH, NEW YORK.

STEAM-BOILER.

SPECIFICATION forming part of Letters Patent No. 541,239, dated June 18, 1895.

Application filed January 26, 1894. Serial No. 498,092. (No model.)

*To all whom it may concern:*

Be it known that I, JOHN F. LAIDLAW, a citizen of the United States, residing at Elmira, in the county of Chemung and State of New York, have invented a new and useful Improvement in Steam-Boilers, of which the following is a specification.

This invention has for one of its objects the production of a sectional steam boiler of improved construction, whereby increased economy in the consumption of fuel is secured, and it has for its further object the production of a preliminary heating and evaporating apparatus which receives the water before it reaches the boiler proper and which serves to effect a preliminary heating of the water and also as an auxiliary steam generator, utilizing for its purposes a large portion of the heat which would otherwise be wasted.

In the accompanying drawings, consisting of eight sheets.

Like letters of reference refer to like parts in the several figures.

Figure 1:
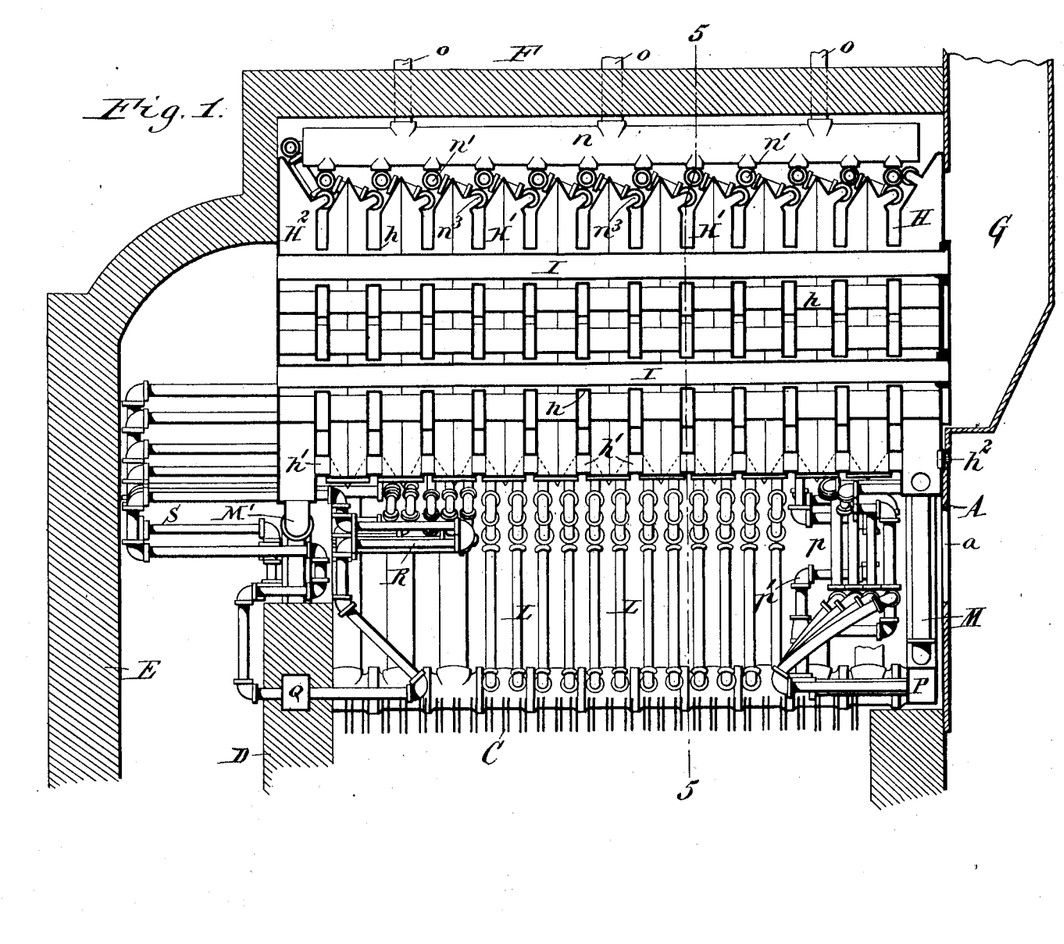
Figure 1 is a longitudinal sectional elevation of my improved steam-boiler.
Figure 2:
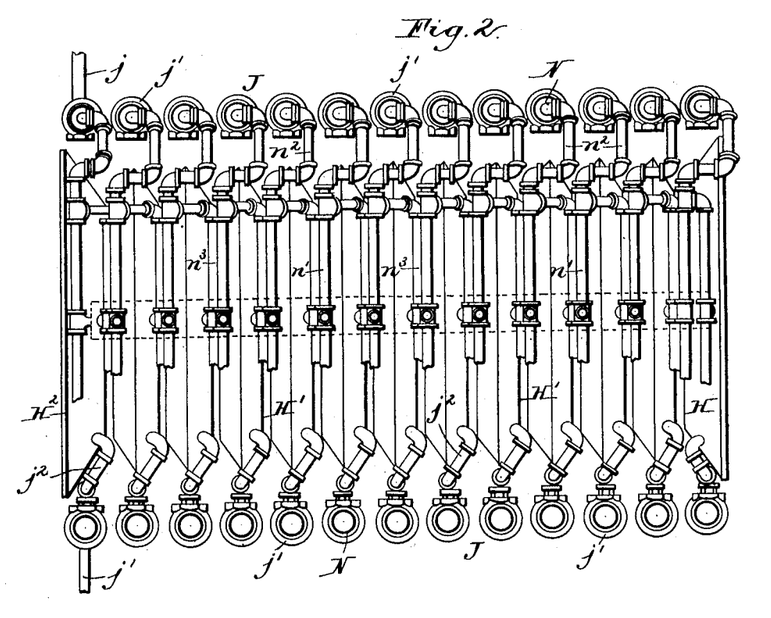
Fig. 2 is a top plan view of the boiler with the masonry removed.

A, Fig. 1, represents the front plate of the boiler housing; $a$, the stoke hole formed in the front plate; B, the side walls of the fire place or furnace; C, the grate arranged between the side walls; D, the fire bridge arranged at the rear end of the grate; E, the rear wall; F, the arch connecting the top of the front plate, side and rear walls, and G the smoke box arranged in front of the upper portion of the front plate.

Figure 6:
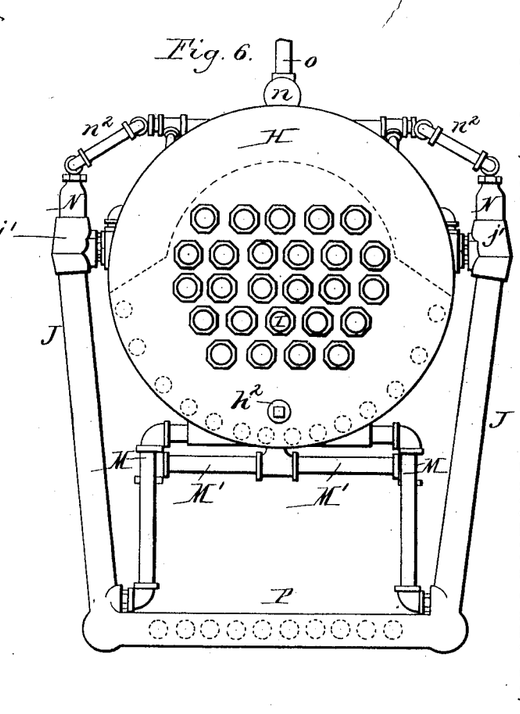
Fig. 6 is a front elevation of the boiler with the masonry removed.
Figure 7:
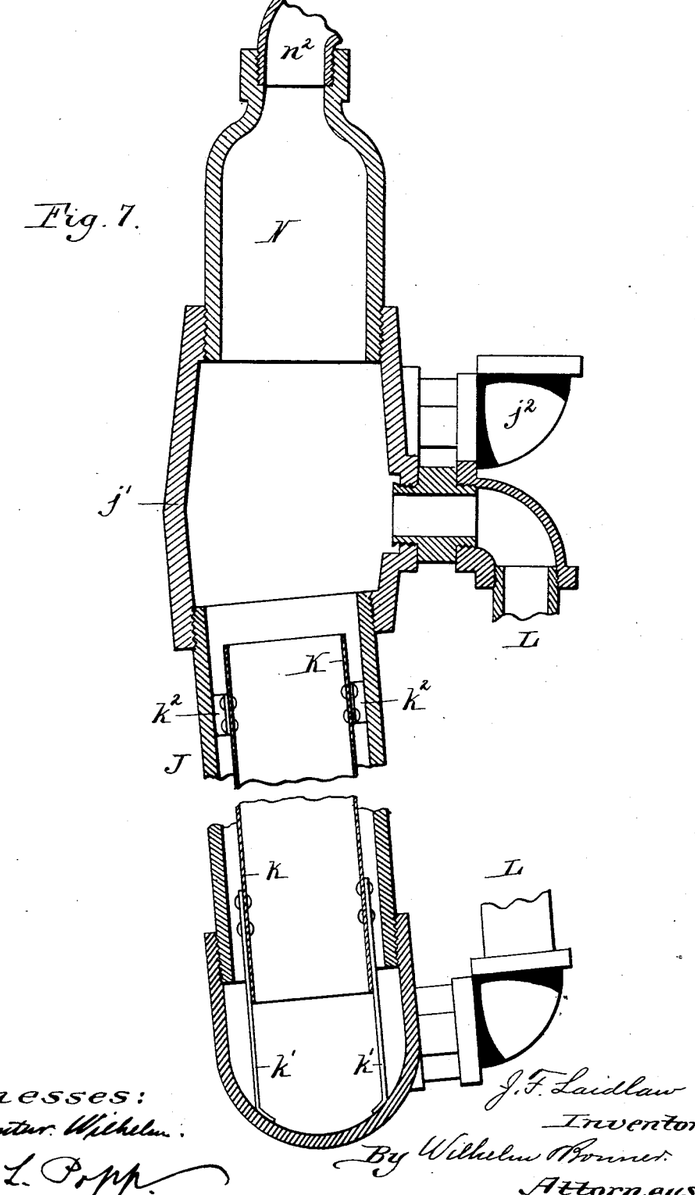
Fig. 7 is a fragmentary vertical section of one of the water-columns and connecting parts.
Figure 8:
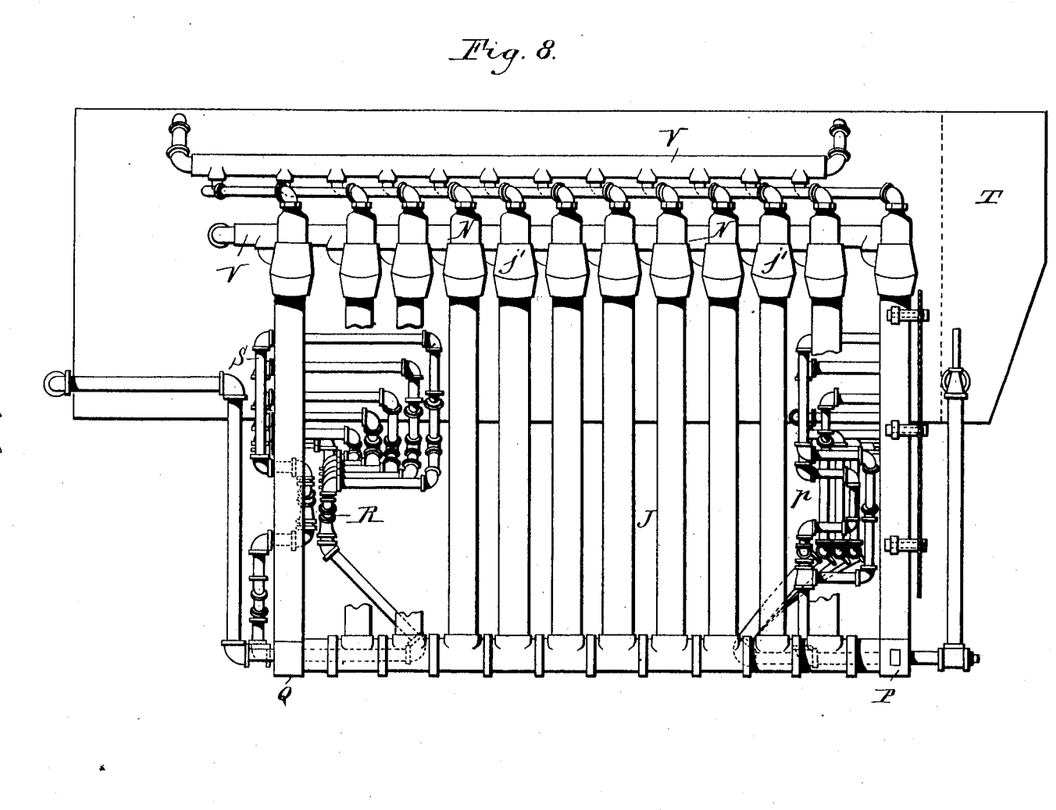
Fig. 8 is a side elevation of a modification of my improved steam-boiler with the masonry removed.
Figure 9:
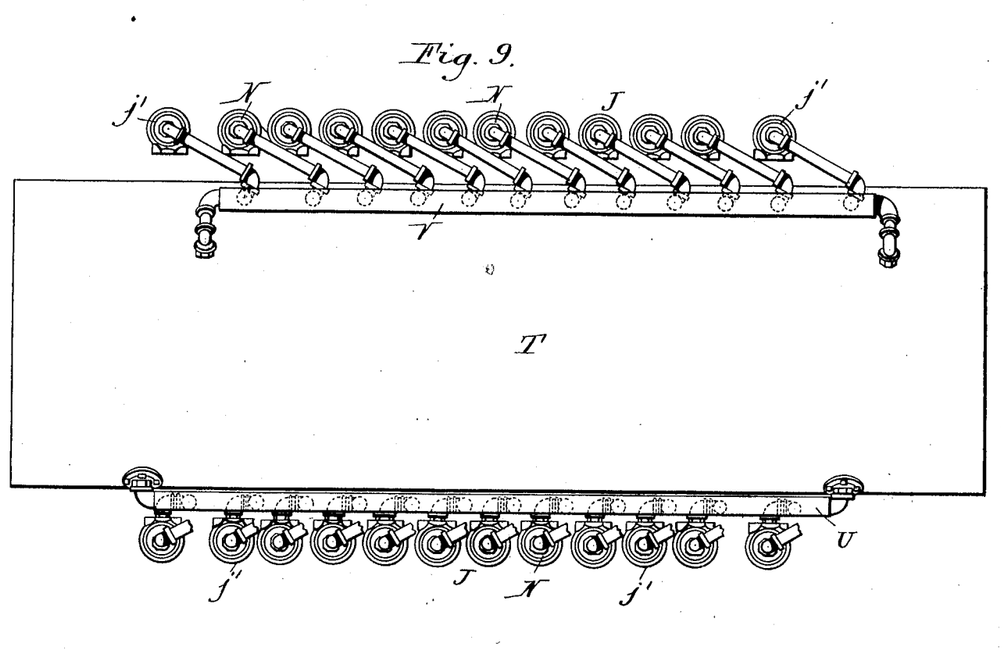
Fig. 9 is a top plan view thereof.
Figure 10:
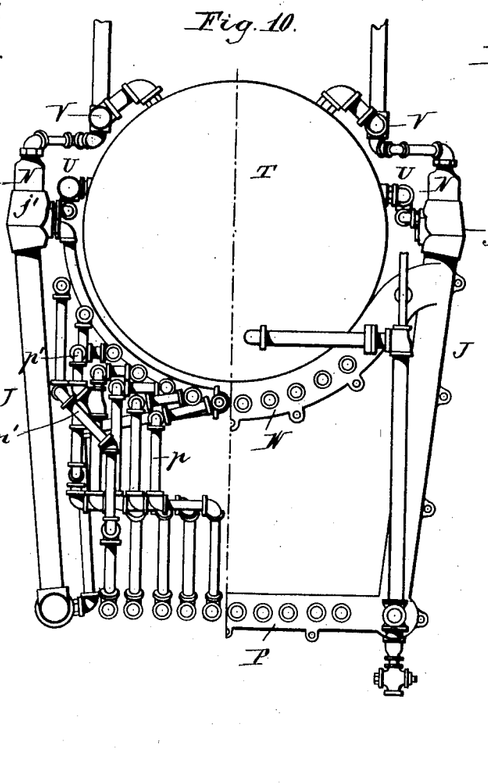
Fig. 10 is a sectional front elevation thereof.
Figure 11:
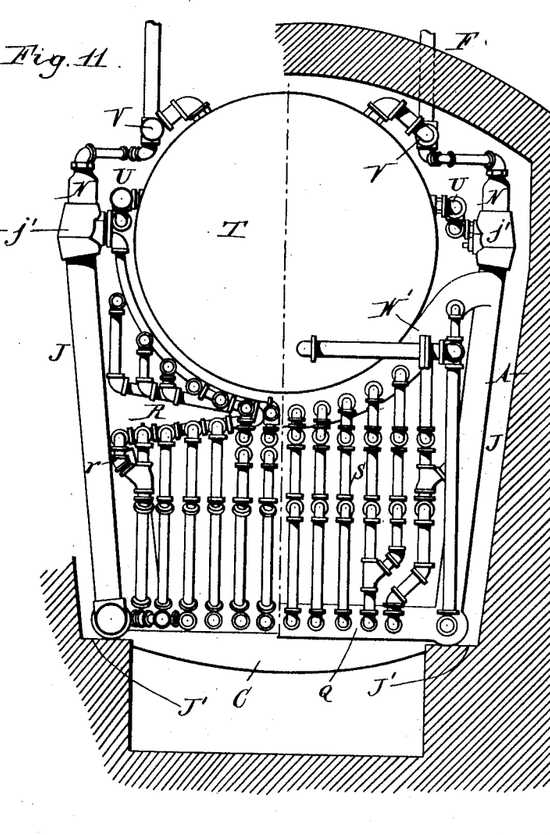
Fig. 11 is a sectional rear elevation thereof.

H H' H² represent a row of boiler sections arranged one behind the other over the grate, the section H being the front section, the section H² the rear section and the section H' the intermediate section. These sections have the form of flat hollow disks or circular chambers, arranged with their flat sides perpendicularly and transversely with reference to the longitudinal dimensions of the boiler and are separated from each other by narrow spaces through which the furnace gases can pass upwardly between the flat opposing sides of the sections. The intermediate sections H' have their peripheral or marginal portions beveled, preferably on both sides as shown in Fig. 1, to facilitate the entrance of the furnace gases and of the radiated heat between the sections. The front and rear sections have only their upper portions beveled, respectively on their rear and front sides, while their lower portions are bounded by a cylindrical or straight peripheral wall as represented in Fig. 1 and as indicated by dotted lines in Fig. 6. The front and rear sections H H² are somewhat larger in diameter than the intermediate sections H'. The front section H is arranged immediately behind the front plate of the boiler furnace and the rear section H² is arranged above the bridge wall.

The water spaces of every two adjoining sections are connected by short tubes or nipples $h$ which are secured in the opposing upright walls of the sections in any suitable manner and which are arranged as closely to each other as possible on the flat upright surface of each section from end to end of the boiler, so that the corresponding nipples in all of the sections are in line with each other.

I represents horizontal flues which pass through the sections and their connecting nipples $h$ and which are secured with their ends to the outer sides of the front and rear sections H H². These flues are of a smaller diameter than the nipples $h$, thereby forming annular spaces between the nipples and the flues whereby communication is established between the sections.

$h'$ represents nipples which connect the lowest portions of the sections so as to establish a line of communication between the lowest portions of the water spaces of all of the sections. This lower line of nipples is not provided with a flue but is left unobstructed so as to facilitate the removal of mud or sediment from all the sections. The front section is provided in its front wall with a removable plug $h^2$ which is arranged in line with this lower line of nipples and which can be removed for discharging the sediment. The intermediate sections are provided on their beveled marginal portions with bosses in which these lower nipples are secured.

J J represent two rows of upright water columns arranged on opposite sides of the boiler sections and the fire-place. These columns receive the feed water before it enters the boiler sections and effect a preliminary heating of the same and serve also as auxiliary steam generators, which utilize for those purposes a large portion of the heat which would otherwise be absorbed by the brick work of the boiler furnace. These water columns preferably extend from the grate upwardly to about the center of the boiler sections. The lower ends of these water columns are provided with T-couplings which rest upon ledges J' formed on the side walls and the couplings of the columns on the same side of the fire-place are connected by screw joints.

$j$ represents water supply pipes connected with the couplings of the rearmost column of both rows.

$j'$ represents couplings secured to the tops of the water columns and connected with the upper portion of the water spaces of the boiler sections by branch pipes $j^2$.

$k$ represents tubular partitions which are arranged in the water columns to cause the water to circulate therein. These tubular partitions are of about the same length as the columns but of smaller diameter, so as to form a narrow circulating space between each column and its partition. The thin sheet of water in this circulating space is heated quickly and rises rapidly while the body of water within the tubular partition, which is of a lower temperature, descends, thereby causing a circulation of the water in each column. The hot water passes from the top of each column by the pipe $j^2$ into the water space of the adjacent section. Each tubular partition is provided at its lower end with feet $k'$ which rest upon the coupling or bottom of the column and at its side with wings $k^2$ which bear against the inside of the column and center the partition in the column.

L represents auxiliary heating pipes which are applied to some of the columns and assist in effecting a preliminary heating of the water before the same enters the boiler sections. Each of the water columns opposite the central portion of the fire place is provided with two of these auxiliary pipes and each of these pipes is connected with its lower end to the lower coupling of the column and passes upwardly along the inner side of the water column to about one-third of its height, thence inwardly underneath the central portion of the adjacent boiler section, thence upwardly in a curve along the side of the section and thence to the upper coupling of the column below the branch pipe $j^2$. The water entering the auxiliary pipes from the lower couplings of the columns is heated during its upward passage through these pipes and discharged into the upper couplings of the columns, where it joins the water which is circulating in the columns or passes through the branch pipe into the boiler sections.

M M' represent return pipes whereby the water in the lower portion of the boiler sections is conducted to the lower ends of the columns. Each of the end sections of the boiler is provided with two of these return pipes. These pipes connect at their upper ends with the lower portions of the boiler sections and extend outwardly and thence downwardly along the inner sides of the end columns and connect with the lower portions of said columns.

N represents steam caps which are secured to the upper ends of the water columns and receive the steam generated in the same and in the auxiliary pipes.

$n$ represents a manifold steam drum arranged lengthwise over the boiler sections and below the arch and provided on its under side with a number of transverse inlet pipes $n'$ extending in opposite directions from the steam drum. The steam caps of the columns are connected by pipes $n^2$ with the transverse pipes $n'$, whereby the steam generated in the columns and in the auxiliary pipes, is conducted directly into the steam drum.

$n^3$ represents transverse steam outlet pipes which are connected with their inner ends to the central upper portions of the boiler sections and connected at their outer ends with the steam inlet pipes $n'$, whereby the steam is drawn off from the upper portions of the boiler sections and delivered into the steam drum.

O represents the main steam outlet pipes connected with the upper side of the steam drum.

P represents a manifold chamber arranged transversely in front of the fire place and connecting the lower ends of the front columns.

Figure 3:
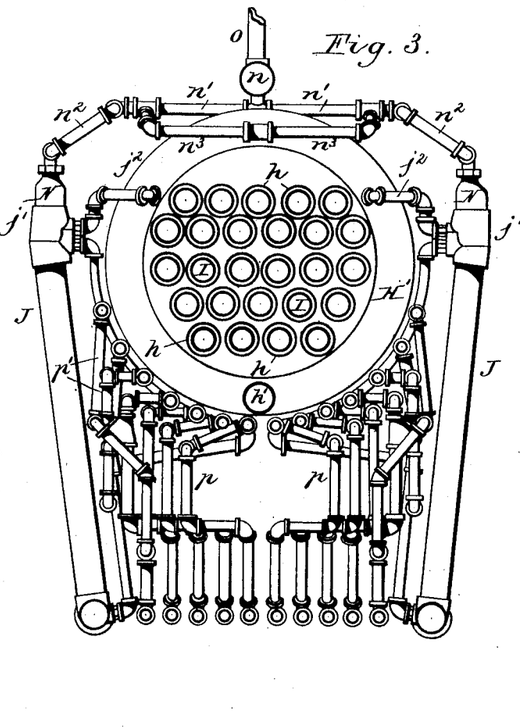
Fig. 3 is a sectional front elevation thereof.

$p$ represents front water heating pipes whereby the heat in the front portion of the fire place is utilized. These pipes are arranged in two groups on opposite sides of the stoke hole. Each of these front heating pipes is connected with the rear side of the front manifold chamber and extends horizontally rearwardly therefrom, thence obliquely upward and forward in a curve, thence outwardly, thence upwardly, thence rearwardly, thence inwardly and thence forwardly and connects with the rear lower portion of the front boiler section H as represented in Figs. 1 and 3. Those of these heating pipes which are nearest the water columns are provided with branch pipes $p'$ which also connect with the front boiler section and increase the heating surface. The water entering the lower ends of the front heating pipes is heated during its upward course and discharges into the front boiler section.

Q represents a rear manifold chamber arranged in the fire bridge and connecting the lower ends of the rear columns.

Figure 4:
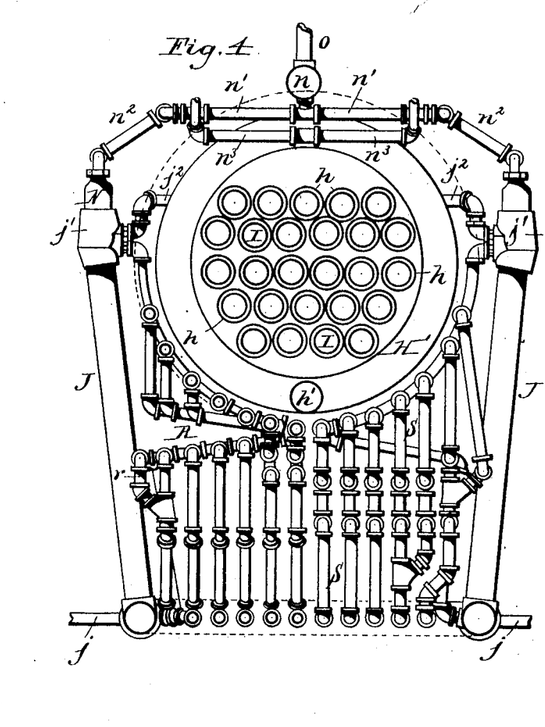
Fig. 4 is a sectional rear elevation thereof.
Figure 5:
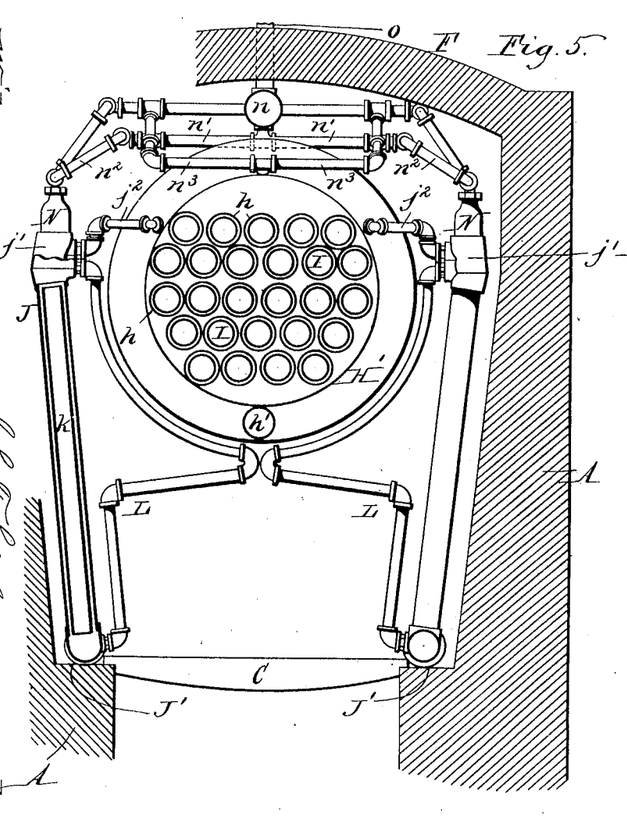
Fig. 5 is a cross-section in line 5 5, Fig. 1.

R represents intermediate heating pipes which are arranged in the rear portion of the fire place and in front of the fire bridge in the form of an upright grating, as represented in Figs. 1 and 4, and which intercept the hot gases and products of combustion before they pass over the fire bridge. Those of these intermediate heating pipes which are arranged in the central portion of the fire place are connected at their rear ends to the rear manifold chamber and extend forwardly therefrom, thence upwardly and rearwardly to the top of the fire bridge, thence upwardly, thence forwardly, thence rearwardly, thence upwardly and thence rearwardly to the lower front portion of the rear boiler section $H^2$. Those of these intermediate heating sections which are adjacent to the columns are also provided with branches $r$ which are also connected with the front side of the rear section and increase the heating surface.

S represents rear heating pipes which are arranged in rear of the fire bridge in the form of an upright grating and which intercept the hot gases and products of combustion as they pass from the fire bridge into the flues at the rear end of the boiler. Each of these rear heating pipes extends rearwardly from the rear side of the rear manifold, thence upwardly along the rear side of the bridge, thence forwardly over the top of the bridge, thence upwardly, thence rearwardly, thence upwardly and thence forwardly to the lower portion of the rear boiler section $H^2$.

It is not essential that the front, rear and intermediate heating pipes be arranged in the precise manner described as the increase of heating surface can be secured by different arrangements of these pipes. The heating pipes arranged below the boiler do not perceptibly effect the radiation of the heat on the shell of the boiler.

The inner sides of the side walls of the furnace, the water columns and the vertical members of the auxiliary pipes preferably diverge upwardly so as to permit the furnace gases to expand as they rise from the fire place.

The water columns, their auxiliary water pipes, the boiler sections and the front and intermediate heating pipes receive direct heat from the fuel on the grate and this direct heat, as well as some of the furnace gases also enters the spaces between the boiler sections and the spaces between the sections and the brick work in which the upper portions of the water columns and the steam drum are arranged, but as there is no passage for the furnace gases from the arch to the smoke stack, there is no draft from the upper portion of this heated space or chamber, which therefore operates as a dead air chamber for retaining the heat. The temperature in this dead air chamber can be carried so high as to super-heat the steam in the steam drum and in the steam spaces at the upper ends of the water columns.

The furnace gases pass from the fire place or combustion chamber over the grate, rearwardly over the fire bridge and upwardly on the rear side of the rear boiler section and thence forwardly through the flues I to the smoke box G.

My improved means for effecting a preliminary heating of the water before it enters the body of the boiler and an auxiliary steam generator is not necessarily limited to a sectional boiler of the peculiar construction herein shown and described, but is also applicable to ordinary boilers and may be applied, for instance, as shown in Figs. 8, 9, 10, and 11. In these figures T represents an ordinary tubular or flue boiler which is arranged horizontally and with which the water columns and auxiliary and other heating pipes are connected.

U represents water manifolds arranged lengthwise on opposite sides of the boiler, each manifold being connected at its end with the water space of the boiler and on its under side with the branch pipes of the upper couplings of the columns.

V represents manifold steam drums arranged lengthwise on opposite sides of the boiler, each drum being connected at its ends with the steam space of the boiler and on its under side with the steam outlet pipes of the columns.

W W' represent downwardly curved manifold chambers which connect the upper portions of the end water columns of both rows and which pass underneath the front and rear portions of the boiler, respectively. The front heating pipes are connected at their upper ends with the rear side of the front manifold chamber W and the upper ends of the intermediate and rear heating pipes are connected respectively with the front and rear sides of the rear manifold chamber.

While I have described my improvements as being used for the generation of steam it is obvious that the same apparatus may be used for heating water in systems of hot water heating for buildings.

I claim as my invention—

1. The combination with the boiler sections arranged in a row and having their opposing faces separated by spaces which permit the heat to pass between the sections, of nipples or short tubes which connect the water spaces of adjoining sections and hold the sections apart, and are exposed to the heat entering between the sections, and flues secured in the outer walls of the end sections and extending through the connecting tubes or nipples substantially as set forth.

2. The combination with upright boiler sections arranged one behind the other and separated by spaces, of nipples or short tubes connecting the water spaces of adjoining sections, flues extending through said nipples or short tubes, and nipples or short tubes unobstructed by a flue and connecting the lower portions of said sections, substantially as set forth.

3. The combination with the boiler sections having their flat opposing sides separated by spaces which permit the heat to pass between the sections and provided with beveled marginal portions whereby the heat is directed between the sections, of connecting nipples or short tubes secured to the flat sides of the sections, and flues passing through said nipples or tubes, substantially as set forth.

4. The combination with upright boiler sections arranged one behind the other, of connecting tubes or nipples, flues secured to the end sections and extending through said tubes or nipples, a furnace in which said sections are arranged and which delivers the furnace gases to the flues in rear of the rear section, and a smoke box which receives the furnace gases in front of the front section, substantially as set forth.

5. The combination with the boiler, of water columns arranged on opposite sides of the boiler, and auxiliary water heating pipes arranged on the inner sides of the columns, and extending from the lower ends of the water columns upwardly, thence inwardly underneath the boiler, and thence upwardly and outwardly to the upper portions of the water columns, substantially as set forth.

6. The combination with the boiler, a steam drum which collects the steam and water columns arranged on opposite sides of the boiler and connecting with the water space thereof, of steam connections leading from the steam spaces of the columns to the steam drum and additional connections whereby communication is established between the steam spaces of the columns and the steam space of the boiler without the intervention of the steam drum, substantially as set forth.

7. The combination with the upright boiler sections arranged one behind the other, of a steam drum arranged above the sections, water columns arranged on opposite sides of the sections and communicating with the water spaces thereof, steam pipes leading from the upper ends of the water columns to the steam drum, and steam pipes leading from the upper portions of the sections to said steam pipes, substantially as set forth.

8. The combination with the boiler, the furnace and the water columns arranged on opposite sides of the boiler, of a transverse manifold chamber connecting the lower ends of the front columns and heating pipes arranged in the front portion of the furnace and connecting the manifold chamber with the boiler, substantially as set forth.

9. The combination with the boiler, the furnace and the fire bridge, of water columns arranged on opposite sides of the boiler and furnace, a transverse manifold chamber connecting the lower portions of the rear columns, and heating pipes arranged in the rear portion of the furnace adjacent to the front side of the bridge and connecting the manifold chamber with the boiler, substantially as set forth.

10. The combination with the boiler, the furnace and the fire bridge, of water columns arranged on opposite sides of the boiler and furnace, a transverse manifold chamber connecting the lower portions of the rear columns, and a transverse row of heating pipes arranged in rear of the fire bridge in the form of a grating and connecting the manifold chamber with the boiler, substantially as set forth.

11. The combination with the boiler, the furnace and the fire bridge, of water columns arranged on opposite sides of the boiler, a manifold chamber connecting the lower portions of the rear columns and arranged in the fire bridge, heating pipes arranged in front of the fire bridge and connecting the manifold chamber with the boiler, and heating pipes arranged in rear of the fire bridge and connecting the manifold chamber with the boiler, substantially as set forth.

Witness my hand this 8th day of January, 1894.

JOHN F. LAIDLAW.

Witnesses:
 ARIEL S. THURSTON,
 H. H. ROCKWELL.